Patented Dec. 22, 1953

2,663,698

UNITED STATES PATENT OFFICE 2,663,698

PROCESS FOR PRODUCING SYNTHETIC TANNINS BY DEHYDRATING AND SULFONATING A NOVOLAK RESIN IN A VACUUM

Ell Dee Compton, Greenwood, Mass., assignor to Monsanto Chemical Company, St. Louis, Mo., a corporation of Delaware No Drawing. Application April 11, 1950, Serial No. 155,364

6 Claims. (Cl. 260—49)

The present invention relates to improved processes for preparing synthetic tannins, particularly synthetic tannins based on novolak resins.

It has been proposed heretofore to prepare synthetic tanning materials by preparing novolak resins by the condensation of phenol with formaldehyde under acid conditions and then sulfonating the novolak resins using acetic anhydride as a diluent. Such prior process is too expensive to be useful on a commercial scale. It has also been proposed heretofore to sulfonate novolak resins at atmospheric pressure. However, such process requires the use of a considerable amount of sulfonating agent and is therefore not as efficient as is desired.

Both of the above described processes have a common disadvantage, not related to cost, in that they provide products which impart a reddish color to a pelt during the tanning process. This color is undesirable in the case of undyed leathers or leathers which are dyed with light colors.

In accordance with the present invention, it is possible to sulfonate novolak resins economically and at the same time produce products which when used alone as tanning agents provide a leather product which is substantially white in appearance.

It is accordingly one object of this invention to provide improved processes for producing sulfonated novolak resins which are useful as tanning agents.

A further object of this invention is to provide improved processes for sulfonating novolak resins to produce synthetic tanning agents which are capable of tanning pelts to form leather which is substantially white in color.

Still further objects and advantages of this invention will appear in the following description and the appended claims.

The processes of this invention are carried out, in general, by dehydrating a novolak resin containing water at sub-atmospheric pressures, adding to the resin while it is under sub-atmospheric pressure a sulfonating agent such as sulfuric acid in an amount sufficient to form a sulfonic acid derivative of the resin which is soluble in water and concurrently subjecting the resin-sulfonating agent mixture to sub-atmospheric pressure until the product becomes soluble in water and neutralizing the reaction mass with an alkaline substance. The above process is preferably carried out by adding water to the resin-sulfonating agent mixture to inhibit further sulfonation after the resin has been sulfonated to the desired extent.

The term "novolak resin" as used herein is intended to cover the oil soluble, fusible condensation products prepared by condensing phenol or mixtures of phenol and cresols with formaldehyde or a formaldehyde polymer such as paraformaldehyde in the presence of water and an acid catalyst, and, preferably, those condensation products which have a low molecular weight and a molar ratio of formaldehyde to phenol less than 0.9 to 1. Such novolak resins may be prepared according to processes disclosed in the prior art.

A preferred novolak resin for use in the processes of this invention is suitably prepared by heating a mixture of phenol and a mineral acid catalyst, preferably phosphoric acid, and then adding a water solution of formaldehyde, preferably formalin of 37% strength, at a rate sufficient to maintain an exothermic reaction, after which the resulting mass is heated at reflux to increase the macromolecular weight of the product. For best results the mixture of phenol and mineral acid is first heated to 90 to 95° C. and then the water solution of formaldehyde is added at a sufficient rate to maintain the mass at those temperatures, using a molar ratio of formaldehyde to phenol between about 0.65 to 1 and 0.75 to 1. The amount of acid present may be varied to some extent, but is, preferably, between 1 and 5% by weight based on the total ingredients used. The duration of the refluxing step, after the addition of the formaldehyde, is largely dependent upon the nature and amount of acid catalyst employed and the subsequent sulfonation step. Satisfactory results have been obtained by refluxing the phenol-formaldehyde condensation products for 3 to 5 hours.

As is pointed out in the foregoing description, it is possible to use mixtures of phenol and cresols instead of phenol in preparing the novolak resins. Satisfactory results have been obtained by using a mixture of phenol and cresols containing up to 25% by weight of a cresol or mixture of cresols. Any one of the cresols, that is, the methyl phenols, may be used in such mixtures, including meta-, ortho- or para-methyl phenol.

After the novolak resin has been prepared it is dehydrated by heating the resin at sub-atmospheric pressures. The novolak resin may be dehydrated in a complete vacuum, but a complete vacuum is usually difficult to attain on a commercial scale. The amount of pressure existing during the dehydration of the resin may be varied to some extent but should be considerably below atmospheric pressure. Best results have been obtained at pressures below 45 millimeters of mercury (absolute pressure). During the heating of the resin in a partial vacuum, the water in the resin, some unreacted phenol and low molecular weight products are distilled off and the temperature of the resin mass rises. At pressures below 45 millimeters of mercury (absolute pressure) it is preferred to stop dehydrating the resin before the temperature of the resin exceeds 100° C.

The extent to which the resin is dehydrated is dependent on several factors, the most important of which is the sulfonating agent which is to be employed in the subsequent sulfonating step. When commercial sulfuric acid of 93% strength is subsequently employed, the resin is heated in a partial vacuum until all or substantially all of the water is removed. In such case the best results are obtained by heating the novolak resin at pressures between 38 and 42 millimeters of mercury (absolute pressure) until the temperature of the resin is between 90 and 100° C., preferably 92 to 94° C. When the heating of the resin is carried out at pressures below 38 millimeters of mercury the resin is satisfactorily dehydrated before the temperature of the resin rises to 90° C. When oleum or sulfuric acid monohydrate is used as a sulfonating agent the resin is not dehydrated completely or substantially completely and it is necessary to allow sufficient water to remain in the resin to provide, after the addition of such sulfonating agent, an aqueous sulfuric acid solution which is substantially as concentrated as commercial sulfuric acid of 93% strength.

After the novolak resin has been dehydrated to the desired extent as described above and while it is still subjected to the sub-atmospheric pressure existing during the dehydration step, a sulfonating agent is added to the resin and the resulting mixture is maintained at the existing sub-atmospheric pressure during the sulfonation reaction. The amount of sulfonating agent used and the duration of the sulfonation can be varied to a considerable extent and depend on various factors such as the particular novolak resin used, the nature of the sulfonating agent, the temperature at which the sulfonation is carried out, the sub-atmospheric pressure used during the sulfonation step, the rate at which the sulfonating agent is added to the dehydrated resin and the purpose for which the product will be used. In general, if the sulfonating agent is added rapidly or all at one time, it is necessary to use larger quantities than is the case when the sulfonating agent is added gradually over a period of time. Therefore, it is preferred to add the sulfonating agent over a relatively long period of time, for example, over a period of 20 to 60 minutes. Moreover, the sulfonation reaction is exothermic, that is, heat is generated and by adding the sulfonating agent gradually it is possible to control the temperature of the reaction mass. The temperature of the reaction mass may also be controlled by cooling the mass or the temperature may be controlled by a combination of these methods.

The temperature of reaction mass is preferably maintained between 80 and 120° C., during the sulfonation step and best results are obtained by maintaining the temperature of the reaction mass between 90 and 100° C.

The pressure in the vessel or other means in which the sulfonation step is carried out should be considerably below atmospheric pressure. Thus, it is possible to use a complete vacuum or a low pressure system. It is preferred to maintain the pressure below 50 millimeters of mercury (absolute pressure), and best results are obtained below 45 millimeters of mercury (absolute pressure), a suitable range for commercial operation being 38 to 42 millimeters of mercury (absolute pressure).

It is preferred to use about 0.4 to 0.5 mol of $SO_3$ for each mol of phenol used in preparing the novolak resin. Thus, it is preferred to use 0.4 to 0.5 mol of sulfuric acid (calculated as 100% acid) for each mol of phenol used in preparing the resin. It is possible to use larger amounts of sulfuric acid when the acid is added rapidly or all at one time. It is also possible to use smaller amounts of acid, that it, 0.35 mol of acid per mol of phenol when the acid is added to the resin slowly.

Using the amounts of sulfuric acid described immediately above, the sulfonation is generally complete when all of the acid is added in those cases where the acid is added over a relatively long period of time, for example, 20 to 60 minutes. However, when the acid is added rapidly or all at one time, it is necessary in most cases to allow the mass to react for a suitable period of time, generally 10 to 30 minutes after the acid has been added. In any case the reaction should be allowed to proceed until the sulfonated resin is soluble in water. For best results the sulfonation step should be allowed to proceed until the resin contains from about 0.3 to 0.35 mol of combined $SO_3$ for each mol of phenol in the resin. In such case the resin when dissolved in water at a pH of 3 to 4.7, has optimum stability in the presence of salt and is infinitely dilutable with water. Commercial sulfuric acid of 93% strength is a superior sulfonating agent for the purposes of this invention.

As soon as the sulfonation is completed to the desired extent, as described above, the reaction mass is brought up to atmospheric pressure, that is, air is admitted to the vessel or other means in which the sulfonation is carried out. At the same time or shortly thereafter, for example, within a few minutes, the action of the sulfonating agent is stopped or inhibited either by neutralizing the excess of sulfonating agent and the sulfonated resin with an aqueous solution of an alkaline substance such as NaOH or by adding sufficient water to the reaction mass to inhibit further sulfonation. The latter method is preferred since the addition of water does not increase the temperature of the mass above the temperature existing in the mass during the sulfonation step, whereas direct neutralization at this stage generates a substantial amount of heat and this is objectionable in some instances particularly when the temperature of the mass exceeds 97° C. as a result of the neutralization. The water added should be at a temperature above 60° C. and preferably between 75 and 95° C. Generally, the addition to the sulfonation mixture of between 40 and 150% by weight of water, based on the weight of the novolak resin gives satisfactory results. Of course, large amounts of water are not necessary for the reason that the product is thus diluted to an unnecessary extent, but large amounts of water may be employed depending upon the ultimate use of the product.

As is pointed out immediately above, the sulfonated resin may be neutralized directly with an aqueous solution of an alkaline substance such as NaOH, but it is preferred to neutralize the reaction mass after the addition of sufficient water to stop or inhibit the sulfonation reaction. It is also preferred to cool the diluted mass or the reaction mass before the addition of the alkaline solution. The amount of alkaline substance present in the aqueous solution should be sufficient to neutralize the unreacted sulfonating agent and to react with the sulfonic acid groups of the resin. Since the sulfonated resin is a strong acid the neutralized sulfonated resin will, in most instances, have a pH in water below 6, and generally within the range of about 1.5 to 5, depending upon the particular alkaline substance used. By "neutralization" is meant the process of reacting the sulfonated resin and excess sulfonating agent with a base in such proportions as to give a solution having a pH between about 1.5 and 5.

Since the tanning agents produced in accordance with processes of this invention are generally used directly in a tanning process, it is preferred to use a sufficient amount of alkaline substance to bring the resin solution to a proper pH for tanning purposes. In such cases the solution is adjusted to a pH of about 3 to 4.7 with the alkaline substance. An organic acid buffer may also be added to the aqueous solution of the alkaline substance to prevent the pH of the solution from rising above the isoelectric point of the collagen in pelts during the tanning operation.

As examples of alkaline substances which are useful for neutralizing the sulfonated resin and excess sulfonating agent may be mentioned the alkali metal hydroxides such as caustic soda or caustic potash, alkali metal carbonates such as sodium carbonate or potassium carbonate or alkali metal-triphosphates such as sodium or potassium triphosphate. Caustic soda or sodium carbonate are preferred.

As examples of organic acid buffers which are useful for the purposes described above may be mentioned glycollic acid and lactic acid, glycollic acid being preferred.

A further understanding of the invention will be obtained from the following example which is intended to further illustrate the invention but not to limit the scope thereof, parts and percentages being by weight.

Example

Thirty and four-tenths parts of phenol and 1.75 parts of a 75% aqueous solution of phosphoric acid were mixed together and heated to a temperature between 90 and 95° C. in a jacketed vessel equipped with a stirrer, an inlet pipe and a reflux condenser. Seventeen and seventy-five hundredths parts of 37% formalin (a 37% water solution of formaldehyde) were added to the phenol-acid mixture through the inlet pipe in the vessel at a rate sufficient to maintain reflux. The addition of formalin required about 85 minutes. The resulting mass was then refluxed for 4 hours.

The mass as obtained above was left in the vessel which was made air tight and a vacuum was applied to the vessel until the pressure inside the vessel was between 38 and 42 millimeters of mercury (absolute pressure). The jacket of the vessel was heated to about 140° C. and the pressure inside the vessel was maintained between 38 and 42 millimeters of mercury (absolute pressure) until the temperature of mass reached 93° C. Fourteen and five tenths parts of 93% commercial sulfuric acid were then introduced into the vessel through the inlet pipe at a steady rate over a period of 45 minutes. During this period the pressure inside the vessel was maintained between 38 and 42 millimeters of mercury (absolute pressure) and the temperature of the mass was maintained at 95° C. by external cooling of the vessel.

After all of the sulfuric acid had been added air was admitted to the vessel to bring the pressure up to atmospheric pressure and 32.4 pounds of water at a temperature of 95° C. were added to the vessel simultaneously with the release of the vacuum to inhibit further sulfonation. The contents of the vessel were then cooled to 40° C. and then neutralized with 15.2 parts of 50% sodium hydroxide. Six and ninety three parts of technical glycollic acid were also added. The pH of the resulting solution was 3.5. This solution contained about 60% solids, of which 50% is active synthetic tannin. The resin in the solution contained about 0.33 mol of combined $SO_3$ for each mol of phenol in the resin.

The solution prepared as above was used in tanning pickled sheepskin pelts and gave a well filled, substantially white, leather which was resistant to discoloration by light.

Various modifications and changes may be made in the processes of this invention as will be apparent to those skilled in the art without departing from the spirit and intent of this invention. It is accordingly understood that the present invention is not to be limited except by the scope of the appended claims.

What is claimed is:

1. A process for producing synthetic tannins which comprises dehydrating a phosphoric acid-catalyzed novolak resin of 1 molecular proportion of phenol and 0.65 to 0.75 molecular proportion of formaldehyde by heating the resin at a pressure between about 38 and 42 millimeters of mercury (absolute pressure) until the temperature of the resin is between 90 and 100° C., adding commercial sulfuric acid of 93% strength to the resin gradually and concurrently maintaining the reaction mass at a pressure between about 38 and 42 millimeters of mercury (absolute pressure) and also maintaining the temperature of the reaction mass between 90 and 100° C. until the resin contains from 0.3 to 0.35 mol of combined $SO_3$ per mol of phenol, the amount of acid added being 0.4 to 0.5 mols of sulfuric acid (calculated as 100% acid) for each mol of phenol, allowing the pressure surrounding the resin to rise to the prevailing atmospheric pressure and substantially concurrently adding between 40 and 150% by weight of water, based on the weight of the novolak resin, said water being at a temperature between 75 and 95° C., and then neutralizing the resulting mixture with an aqueous solution of an alkaline substance and an organic acid buffer to form a solution having a pH between about 3 and 4.7.

2. A process according to claim 1, but further characterized in that the alkaline substance is sodium hydroxide.

3. A process according to claim 1, but further characterized in that the alkaline substance is sodium carbonate.

4. A process according to claim 1, but further characterized in that the alkaline substance is potassium hydroxide.

5. A process according to claim 1, but further characterized in that the organic acid buffer is glycollic acid.

6. A process according to claim 1, but further characterized in that the organic acid buffer is lactic acid.

ELL DEE COMPTON.

References Cited in the file of this patent

UNITED STATES PATENTS

| Number | Name | Date |
|---|---|---|
| 1,695,655 | Herrly | Dec. 18, 1928 |

FOREIGN PATENTS

| Number | Country | Date |
|---|---|---|
| 620,679 | Great Britain | Mar. 29, 1949 |
| 900,655 | France | Oct. 16, 1944 |

OTHER REFERENCES

Ellis, The Chemistry of Synthetic Resins, vol. I, page 349 (1935), Reinhold Pub. Corp.